United States Patent
McDonald

(10) Patent No.: US 10,780,462 B2
(45) Date of Patent: Sep. 22, 2020

(54) WASHING APPARATUS FOR CLEANING GAME, FRUIT, VEGETABLES, FISH OR CRUSTACEA IN A CONTAINER

(71) Applicant: Tim McDonald, Missouri City, TX (US)

(72) Inventor: Tim McDonald, Missouri City, TX (US)

( * ) Notice: Subject to any disclaimer, the term of this patent is extended or adjusted under 35 U.S.C. 154(b) by 212 days.

(21) Appl. No.: 15/951,667

(22) Filed: Apr. 12, 2018

(65) Prior Publication Data

US 2018/0236500 A1 Aug. 23, 2018

Related U.S. Application Data

(63) Continuation-in-part of application No. 15/409,058, filed on Jan. 18, 2017, which is a continuation-in-part of application No. 14/877,519, filed on Oct. 7, 2015, now Pat. No. 10,456,812, which is a continuation-in-part of application No. 14/812,545, filed on Jul. 29, 2015, now Pat. No. 9,408,412, which is a continuation-in-part of application No.
(Continued)

(51) Int. Cl.
| | |
|---|---|
| *B08B 3/04* | (2006.01) |
| *A22C 17/08* | (2006.01) |
| *A22C 21/00* | (2006.01) |
| *B08B 3/14* | (2006.01) |
| *A23N 12/02* | (2006.01) |
| *B08B 3/10* | (2006.01) |
| *A22C 25/02* | (2006.01) |

(52) U.S. Cl.
CPC .............. *B08B 3/048* (2013.01); *A22C 17/08* (2013.01); *A22C 21/0061* (2013.01); *A22C 25/02* (2013.01); *A23N 12/023* (2013.01); *B08B 3/102* (2013.01); *B08B 3/14* (2013.01)

(58) Field of Classification Search
CPC ........... B08B 3/048; B08B 3/102; B08B 3/14; A22C 17/08; A22C 21/0061; A22C 25/02; A23N 12/023
USPC .......... 134/94.1, 102.2, 25.3, 111, 184, 25.1, 134/144, 198, 22.18
See application file for complete search history.

(56) References Cited

U.S. PATENT DOCUMENTS

| | | | | |
|---|---|---|---|---|
| 654,647 | A | * | 7/1900 | Koeppelmann ......... B03B 5/623 134/25.1 |
| 732,637 | A | * | 6/1903 | Insley ................. B01F 13/0244 366/101 |

(Continued)

*Primary Examiner* — David G Cormier
*Assistant Examiner* — Thomas Bucci
(74) *Attorney, Agent, or Firm* — Egbert Law Offices, PLLC

(57) ABSTRACT

An apparatus for cleaning game, fruit, vegetables, fish, or crustacea in a container has a pipe and a connector connected to the pipe adjacent one end of the pipe. The pipe has a plurality of apertures formed in spaced relation to each other along a length of the pipe. The pipe is adapted to extend generally vertical within the container. The plurality of apertures are adapted to direct a flow of water in a generally cyclonic path in the container. The connector is adapted to introduce water into and through the pipe from a water hose or a conduit. A fastener is affixed to the pipe or the connector so as to removably affix the pipe to the a container. A spacer is affixed to the pipe so as to position the pipe a distance away from a wall of the container.

10 Claims, 6 Drawing Sheets

Related U.S. Application Data

14/550,195, filed on Nov. 21, 2014, now Pat. No. 9,320,286.

(56) References Cited

U.S. PATENT DOCUMENTS

| | | | | |
|---|---|---|---|---|
| 1,036,988 A | * | 8/1912 | Fink | B08B 3/02 134/102.2 |
| 1,956,524 A | * | 4/1934 | Byram | A01K 63/003 137/590.5 |
| 1,964,430 A | * | 6/1934 | Eberts | A23N 12/02 15/3.11 |
| 2,201,380 A | * | 5/1940 | Tierney | B08B 3/006 134/143 |
| 2,578,808 A | * | 12/1951 | Johnson | A23N 12/023 209/173 |
| 2,660,754 A | | 12/1953 | Roshko | |
| 2,725,062 A | * | 11/1955 | Vile | A01K 43/005 134/94.1 |
| 2,781,544 A | * | 2/1957 | Skrmetta | A22C 29/026 452/5 |
| 2,860,371 A | * | 11/1958 | Krull | A22C 25/02 452/99 |
| 2,966,159 A | * | 12/1960 | Ruegnitz | A01K 43/005 134/188 |
| 3,094,740 A | * | 6/1963 | Reeves | A22C 21/02 452/78 |
| 3,189,927 A | * | 6/1965 | Dyar | A23N 12/023 15/3.16 |
| 3,422,826 A | * | 1/1969 | Ballard | B08B 3/02 134/107 |
| 3,902,457 A | * | 9/1975 | Musgrove | B07C 5/12 119/218 |
| 3,916,777 A | * | 11/1975 | Earl | A22C 9/001 99/533 |
| 3,958,022 A | | 5/1976 | Danesh | |
| 4,080,975 A | * | 3/1978 | Williams, Jr. | B08B 3/102 134/102.2 |
| 4,101,607 A | * | 7/1978 | Bart | B01F 3/04099 119/263 |
| 4,173,051 A | * | 11/1979 | Reid | A47J 43/24 134/191 |
| 4,876,768 A | * | 10/1989 | Bright | A22C 25/02 452/105 |
| 5,129,855 A | * | 7/1992 | Bruckert | A22C 25/02 366/325.92 |
| 5,220,880 A | * | 6/1993 | Alworth | A01K 63/02 119/203 |
| 5,253,610 A | * | 10/1993 | Sharber | A01K 79/02 119/200 |
| 5,419,353 A | * | 5/1995 | Chen | B08B 3/102 134/102.1 |
| 5,791,290 A | * | 8/1998 | Mueller | A01K 61/17 119/218 |
| 5,938,519 A | * | 8/1999 | Wright | A22C 21/04 452/173 |
| 6,021,788 A | * | 2/2000 | King | A47L 15/0086 134/102.1 |
| 6,161,504 A | * | 12/2000 | Jungling | A01K 79/00 119/215 |
| 6,213,308 B1 | * | 4/2001 | Bajema | A23N 12/023 209/156 |
| 6,443,100 B1 | * | 9/2002 | Brenton | A01K 61/60 119/259 |
| 6,582,612 B1 | * | 6/2003 | White | A01K 63/04 210/747.6 |
| 7,087,257 B1 | | 8/2006 | Prestenbach | |
| 7,287,488 B2 | * | 10/2007 | Taylor | A01K 61/60 119/219 |
| 7,363,878 B2 | * | 4/2008 | McRobert | A01K 63/10 119/259 |
| 8,062,105 B2 | * | 11/2011 | Aandewiel | A22C 21/04 452/74 |
| 8,950,361 B1 | * | 2/2015 | Pierce | A01K 63/042 119/200 |
| 8,990,972 B2 | * | 3/2015 | Lopaciuk | A47L 15/0047 4/222 |
| 9,320,286 B1 | * | 4/2016 | McDonald | A22C 17/08 |
| 9,408,412 B2 | * | 8/2016 | McDonald | B08B 3/048 |
| 2001/0026824 A1 | * | 10/2001 | Caridis | A23N 12/023 426/506 |
| 2011/0072980 A1 | * | 3/2011 | Maupin | A23B 4/26 99/348 |
| 2011/0220158 A1 | * | 9/2011 | Ho | A47J 43/24 134/198 |
| 2013/0093107 A1 | * | 4/2013 | Funderburg | A22C 21/0061 261/121.1 |
| 2014/0127986 A1 | * | 5/2014 | Cady | A22B 5/0082 452/173 |
| 2016/0143345 A1 | * | 5/2016 | McDonald | B08B 3/102 134/10 |
| 2018/0111175 A1 | * | 4/2018 | Becker | B05B 3/026 |

\* cited by examiner

WASHING APPARATUS FOR CLEANING GAME, FRUIT, VEGETABLES, FISH OR CRUSTACEA IN A CONTAINER

RELATED U.S. APPLICATIONS

The present application is a continuation-in-part of U.S. patent application Ser. No. 15/409,058, filed on Jan. 18, 2017, and entitled "Apparatus for Cleaning Crustacea or Game", presently pending. U.S. patent application Ser. No. 15/409,058 is a continuation-in-part of U.S. patent application Ser. No. 14/877,519, filed on Oct. 7, 2015, and entitled "Apparatus and Method for Washing Meat and/or Produce", presently pending. U.S. application Ser. No. 14/877,519 is a continuation-in-part of U.S. patent application Ser. No. 14/812,545, filed on Jul. 29, 2015, and entitled "Apparatus and Method for Cleaning Produce". U.S. patent application Ser. No. 14/812,545 issued as U.S. Pat. No. 9,408,412 on Aug. 9, 2016. U.S. application Ser. No. 14/812,545 is a continuation-in-part of U.S. application Ser. No. 14/550,195, filed on Nov. 21, 2014. U.S. patent application Ser. No. 14/550,195 issued as U.S. Pat. No. 9,320,286 on Apr. 26, 2016 and was entitled "Apparatus and Method for Cleaning Game".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the cleaning or washing of game, fruit, vegetables, fish, or crustacea in a container. More particularly, the present invention relates to a spraying article as used for our directing a flow of water in cyclonic path in the container so as to remove debris from the surface of the food items contained in the container.

2. Description of Related Art Including Information Disclosed Under 37 CFR 1.97 and 37 CFR 1.98

During the course of hunting, it becomes necessary to harvest the meat from the killed game. The game can be in the nature of birds, fish, deer, boars, and other commonly-hunted game. When the meat is harvested, the harvested meat is often tossed into a container, along with the associated debris, such as feathers, hair, blood, scales, and related debris. After the meat is collected in the container, the meat must be meticulously cleaned in order to separate the debris from the meat. This is a very time-consuming and difficult operation. As such, a need has developed so as to provide an apparatus and method so as conveniently and efficiently separate the debris from the meat.

In particular, in the hunting of fowl, the bird is de-breasted so that the breast meat can be tossed into the container. The person harvesting the meat will often have feathers and blood on his or her hands. Whenever the harvested breast is tossed into the container, the feathers and blood will also be passed into the container. After all of the breasts, blood and feathers have been accumulated in the container, another operation is required to take each of the breasts from the container and meticulously clean the breast of blood and feathers. As a result, a clean bird breast is obtained.

In the case in which fish are the game that is being caught, the fillets of the fish are separated from the body of the fish and also tossed into the container. During the process of descaling the fish, residual scales and blood will reside on the hands of the person cleaning the fish. The scales and blood will be delivered, along with the harvested meat, into the container. Once again, a need has developed so as to be able to properly separate the meat of the fish from the scales and the blood.

In the past, various patents have issued relating to devices for cleaning game. For example, U.S. Pat. No. 2,860,371, issued on Nov. 18, 1958 to R. M. Krull, describes a fish cleaning device. This fish cleaning device includes a generally cylindrical housing. The housing has a plurality of longitudinal corrugations therein spaced around an upper compartment. An electric motor is mounted in the lower compartment and has a vertical shaft extending through the wall into the upper compartment. A scaling plate is mounted on the shaft in rotatable relationship therewith adjacent the wall in the upper compartment. The plate has a plurality of angularly spaced upwardly projecting generally radial ridges thereon so as to cause tumbling action in fish contained in the upper compartment.

U.S. Pat. No. 2,966,159, issued on Dec. 27, 1960 to R. C. Ruegnitz, describes an egg washing apparatus. This egg washing apparatus includes a container having an imperforate detachable cover and includes a Tchamber adapted to receive a liquid. A perforate basket supports eggs within the container and has a sleeve extending centrally therein above a horizontal plane defined by the upper rim of the basket. The basket is removably suspended within the chamber. An agitator is provided that includes a vertical shaft equipped with a plurality of elongated vertical blades. A motor is arranged with the agitator for rotating the agitator.

U.S. Pat. No. 4,173,051, issued on Nov. 6, 1979 to J. P. Reid, describes a vegetable washer for washing food articles. The washing apparatus includes a container for housing the food articles, an agitation system and washing system for removing undesired foreign materials from the surface of the food articles, and a discharge system.

U.S. Pat. No. 4,726,095, issued on Feb. 23, 1988 to Bissell Jr. et al., discloses a fish scaler device. The device includes a water bucket, an abrasive continuous surface within the bucket, and an agitator for water within the bucket. As the water is agitated, fish suspended within the bucket gently tumble against the abrasive surface and are thereby scaled. The abrasive surface is an inwardly dimpled bucket liner. The agitator is a rotatable impeller.

U.S. Pat. No. 4,763,386, issued on Aug. 16, 1988 the H. A. Wissbroecker, teaches a fish scaling apparatus that includes a container and a cylindrical insert including a plurality of inwardly-extending projections. The projections are provided with a rough or sharp edge. A paddle member is disposed within the interior of the cylindrical insert and is connected to a shaft extending exterior of the container. The shaft is adapted for connection to the chuck of a portable drill. When the drill is operated, the rotation of the paddle member occurs within the interior of the cylindrical insert. The rotation causes fish disposed within the interior of the cylindrical insert to come into contact with the inwardly-extending projections so as to remove the scales from the fish.

U.S. Pat. No. 4,876,768, issued on Oct. 31, 1989 the C. K. Bright, shows a fish scaler that includes a bucket. A perpendicularly extending rod is rotatably connected to the lid of the bucket. A scaling element is attached to the rod. A plurality of scaling protrusions are attached to the exterior of the scaling element. The rotation of the scaling element causes relative movement between the scaling protrusions and the suspended fish so as to remove the scales from the suspended fish.

U.S. Pat. No. 5,129,855, issued on Jul. 14, 1992 to Bruckert et al., describes a fish scaler apparatus that includes an exterior cylindrical container with an interior cylindrical insert. A central axle is directed through a lid of the container so as to accommodate a drill so as to permit the rotation of the axle. The axle includes a central conduit with exterior ports to effect the washing of the fish within the container. The ports are in fluid communication with a fluid source, such as a garden hose.

U.S. Patent Application Publication No. 2013/0093107, published on Apr. 18, 2013 to R. Funderburg, discloses a fish and game washer that is designed to wash and clean meat. The meat is put into a bucket and a water source is connected thereto. Air is sucked in to mix with water. This causes the meat float up from the bottom and begin to toss and tumble. This takes the loose scales, feathers, blood and debris over the top of the bucket.

U.S. Patent Application Publication No. 2014/0127986, published on May 8, 2014 to W. Cady, describes a cleaning device that uses water pressure to prepare fish and wild game for consumption. A bucket is described having a conduit affixed to a wall thereof. The conduit can be connected to a source of water pressure such that water pressure is directed into the interior of the bucket so as to interact with the game within the interior of the bucket.

U.S. Pat. No. 9,320,286, issued on Apr. 26, 2016 to the present inventor, shows an apparatus and method for cleaning game. This apparatus has a container with an interior volume defined by a wall and a pipe positioned in the container adjacent to the wall. The pipe has at least one aperture suitable for directing a flow of water toward a portion of the wall spaced from the pipe such that the flow of water creates a cyclonic path in the container. The pipe extends generally vertically along the wall of the container. The pipe includes a plurality of apertures formed in spaced relation to each other along the length of the pipe.

U.S. Pat. No. 9,408,412, issued on Aug. 9, 2016 to the present inventor, describes an apparatus and method for cleaning produce. This apparatus has a container with an interior volume defined by a wall in a pipe positioned in the container adjacent the wall. The pipe has at least one aperture suitable for directing a flow of water toward a portion of the wall spaced from the pipe such that the flow of water creates a cyclonic path in the container. The pipe extends generally appropriate vertically along the wall of the container. The pipe includes a plurality of apertures formed in spaced relation to each other along the length of the pipe. The method includes overflowing the container such that the debris on the produce is removed from the produce.

Seafood boils refer to various types of social events in which shellfish or crustacea are the central elements. Regional variations dictate the kinds of seafoods, the accompaniments and side dishes, and in the preparation techniques (e.g. boiling, steaming, baking, or raw). In some cases, a boil may be sponsored by a community organization as a fundraiser or a mixture. Boils are also held by individuals for their friends and family for weekend get-togethers and summer holidays. There are also companies that can cater a boil for large and small events.

Shrimp, crab and crawfish boils are a Louisiana tradition and can be found across Louisiana and along the Gulf Coast. These shrimp, crab and crawfish boils are becoming more popular in various other areas around the United States and foreign countries. One reason for the popularity of crawfish is the price. Shrimp and crab or higher valued crustacea and may be a less affordable option for larger groups. A boil is usually carried out in a large pot (60 to 80 quarts) fitted with a strainer and heated by propane. Seasonings include crawfish boil packets, cayenne pepper, hot sauce, salt, lemons and bay leaves. Ears of corn, new potatoes, onions, and heads of garlic are usually added in shrimp and crawfish boils. Some people add smoked sausage links or mushrooms. When cooking crawfish, there is a debate over whether or not the crawfish must first be purged by covering them with clear water and a generous amount of salt for a few minutes. Advocates argue that this forces the crawfish to rid their bodies of impurities.

Prior to boiling the crustacea, it is important to clean the crustacea. Typically, the crawfish and shrimp can have debris and impurities on the outer surface thereof. If the crustacea are not cleaned, then this can present a gritty or unpleasant taste following the boil. Typical cleaning preparations, in the past, have been to place a large amount of crawfish into a bucket and then using a hose to spray water over the crawfish in the bucket. After the bucket is filled with water, the bucket is tipped over by hand manipulation so as to remove the debris-containing water. This requires a great deal of manual effort. Additionally, so as to assure that the crawfish and/or shrimp are very clean, this cleaning step must be carried out multiple times. Ultimately, after a suitable amount of cleaning, the crawfish or shrimp will be ready for the boil. During the steps of cleaning, it is quite common for some of the crawfish to escape the cleaning bucket. These crawfish must be manually retrieved and returned for further processing. Many people find that the process of cleaning the crawfish or shrimp is time-consuming and unpleasant. As such, a need has developed so as to be able to efficiently clean the crustacea prior to the step of boiling.

In the past, various patents have issued relating to processes for cleaning crustacea, such as crawfish. In particular, U.S. Pat. No. 2,660,754, issued on Dec. 1, 1953 to F. O. Roshko, shows a crawfish picking machine for separating meat from the hulls of crawfish. The picking machine includes a frame having an upper and a lower roller mounting member, upper and lower parallel horizontally disposed rollers mounted one substantially vertically above the other on these members, adjustable tensioning means between the mounting members that yieldably urge the members and the associated rollers together to form a crotch between the rollers, and a drive means operatively connected with the rollers for positively rotating the rollers in opposite directions at a uniform rate. A water jet sprays in front of the crotch substantially parallel with the lower forward peripheral portion of the upper roller and has jet openings directed toward the peripheral portion of the upper roller between the spray and the crotch.

U.S. Pat. No. 2,781,544, issued on Feb. 19, 1957 to T. C. Skarmetta, shows a seafood cleaning machine. This shrimp cleaning machine includes a longitudinally extending generally flat shrimp-receiving platform having flexible, transversely downwardly curved side edges, a support means of which the flexible side edges are entrained, a means operatively connected the platform for transversely reciprocating the platform, longitudinally extending rollers engaging a top surface of the platform adjacent the side edges to form crotches with the platform. The rollers are oscillatably driven by their contact with the top surface of the platform. The surfaces of the rollers and the platform have different coefficients of friction whereby a shrimp received in a crotch will cling to one surface and slip on the other surface to thereby rotate the shrimp until a loose end of the shell is caught between the roller and the platform and the shell is unwound from the shrimp and drawn through the crotch and from the platform.

U.S. Pat. No. 3,958,022, issued on May 18, 1976 to A. Danesh, describes a process for treating seafood. This treatment of seafood allows toxic heavy metal ions to be removed from the seafood so as to make the seafood safe for consumption. The method includes washing the seafood with an organic sulfur complexing agent for heavy metal ions and heating the seafood at a temperature and for a time sufficient to volatilize the heavy metal ions therefrom.

U.S. Pat. No. 7,087,257, issued on Aug. 8, 2006 to Prestenbach, teaches a crustacea and seafood process for preparing fresh uncooked crustaceans, such as crawfish, lobster, crab and shrimp for shipment to consumers in a frozen state. The process includes a washing process. This washing process submerges the crustaceans in a few inches of clean running water. The crustaceans are treated with ozone introduction of a preservative and a bacteriacide while under a vacuum. The crustaceans are spray coated with a seasoning and then quick frozen. They are then packaged in bulk for individualized cook-and-serve containers.

It is an object of the present invention to provide a washing apparatus for cleaning game, fruit, vegetables, fish or crustacea that effectively the separates debris from the food items.

It is another object of the present invention to provide a washing apparatus for cleaning game, fruit, vegetables, fish or crustacea which serves to pressure wash the food items.

It is another object of the present invention to provide an apparatus for cleaning game, fruit, vegetables, fish, or crustacea that avoids the need to hand wash the food.

It is another object of the present invention to provide a washing apparatus for cleaning game, fruit, vegetables, fish, or crustacea the greatly facilitates the ability to clean the container after the washing process.

It is still another object of the present invention to provide an apparatus for the cleaning of game, fruit, vegetables, fish or crustacea which is adaptable to a variety of sizes and shapes of containers.

It is still another object of the present invention to provide an apparatus for cleaning game, fruit, vegetables, fish or crustacea which enhances the transportability of the apparatus.

It is another object of the present invention to provide an apparatus for cleaning game, fruit, vegetables, fish or crustacea which can be easily assembled.

It is still further object of the present invention to provide an apparatus for cleaning game, fruit, vegetables, fish or crustacea which has a minimal footprint in a commercial environment.

It is still a further object of the present invention to provide an apparatus for cleaning game, fruit, vegetables, fish or crustacea which can be easily stored, transported or displayed.

It is still a further object of the present invention to provide an apparatus for cleaning game, fruit, vegetables, fish, or crustacea which is relatively inexpensive.

These and other objects and advantages of the present invention will become apparent from a reading of the attached specification and appended claims.

BRIEF SUMMARY OF THE INVENTION

The present invention is a washing apparatus for various food items. As used herein, the term "crustacea" can refer to crawfish, shrimp, crab and lobster. The term "game" can refer to fish, birds, deer, bore, and similar wildlife. The terms "fruit" and "vegetables" can refer to various fruits and vegetables that have exterior surfaces that require cleaning, such as, for example, apples, oranges, potatoes, lettuce, and tubers.

The apparatus of the present invention comprises a pipe having a plurality of apertures formed in spaced relationship to each other along a length of pipe, and a connector connected to the pipe adjacent to one end of the pipe. The pipe is adapted to extend generally vertically within the container. The plurality of apertures are adapted to direct a flow of water in a cyclonic path in the container. The connector is adapted to introduce water into and through the pipe from a water hose or a water conduit.

Each of the plurality of apertures has a slot. The slot has a length substantially greater than a length of the aperture. In an embodiment of the present invention, the slot has a generally oval configuration. The aperture is located centrally of the slot. The pipe has a plurality of spacers extending transversely to a longitudinal axis of the pipe. The plurality of spacers are adapted to generally abut a wall of the container. In the preferred embodiment of the present invention, each of the plurality of spacers comprises a fin having an outer edge. One end of the outer edge is radially closer to the pipe than an opposite end of the fin.

A fastener can be affixed to the pipe or the connector. The fastener is adapted to affix the pipe to the container. The fastener removably affixes the pipe to the container. In the preferred embodiment, the fastener is a clamp.

In another embodiment the present invention, the apparatus includes a container having an inner volume defined by a wall, a pipe removably affixed to the container and having a plurality of apertures formed in spaced relation to each other along a length of the pipe, and a connector connected to the pipe adjacent one end of the pipe. The pipe is adapted to extend generally vertically within the container. The plurality of apertures are adapted to direct a flow of water in a cyclonic path in the container. The connector is adapted to introduce water into and through the pipe from a water hose or a conduit.

In this embodiment of the present invention, the pipe is clamped to the container adjacent to the upper edge of the container. In particular, there is a fastener that is affixed to the pipe or to the connector. The fastener engages the upper edge of the container so as to position the pipe within the container. The connector is positioned over the upper edge of the container. A water hose or conduit is affixed to the connector and extends exterior of the container.

The present invention is also a spraying article for cleaning game, fruit, vegetables, fish or crustacea in a container. The spraying article comprises a pipe having a plurality of apertures formed in spaced relation to each other along a length of the pipe, and a connector connected to the pipe adjacent one end of the pipe so as to introduce water into and through the pipe from a water hose or a conduit. The pipe is adapted to extend vertically within the container. The plurality of apertures are adapted to direct a flow of water in a cyclonic path in the container. The pipe has a plurality of spacers extending transverse to a longitudinal axis of the pipe. The plurality of spacers generally abut the wall of the container.

This foregoing Section is intended describe, with particularity, the preferred embodiments of the present invention. It is understood that modifications to these preferred embodiments can be made within the scope of the appended claims. As such, this Section should not be construed, in any way, as limiting of the broad scope of the present invention. The present invention should only be limited by the following claims and their legal equivalents.

DETAILED DESCRIPTION OF THE INVENTION

Figure 1:
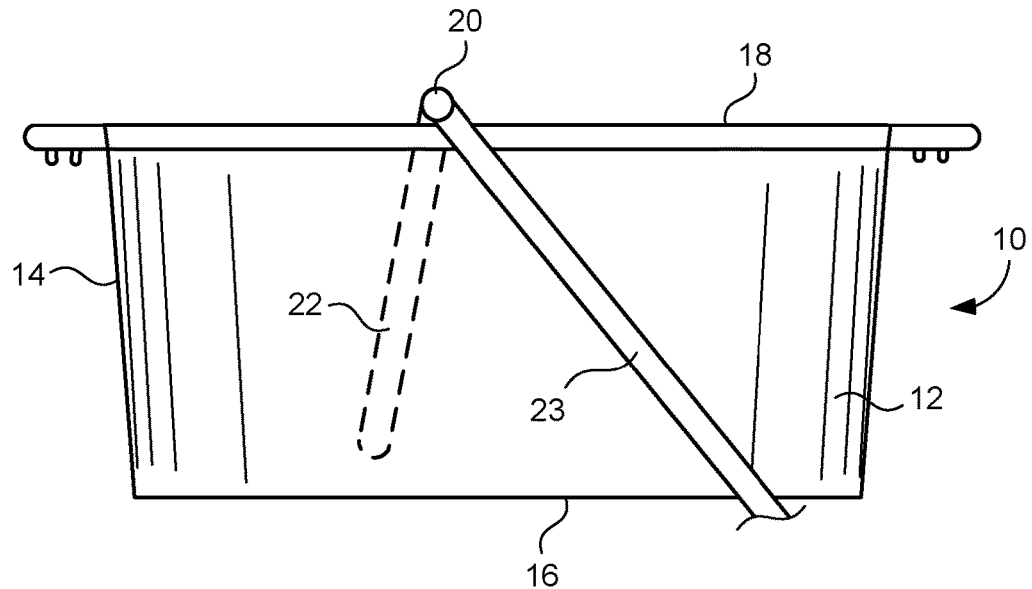
FIG. 1 is a side elevational view of the washing apparatus in accordance with the preferred embodiment the present invention.

Referring to FIG. 1, there is shown the apparatus 10 used for the cleaning of game, fruit, vegetables, fish, or crustacea in accordance with the present invention. The apparatus 10 includes a container 12 having an interior volume defined by a wall 14. The container 12 has a bottom 16 and an upper edge 18. A pipe 22 (shown in broken lines) is positioned adjacent to the wall 14. The pipe will have a plurality of apertures adapted to direct a flow of water toward a portion of the wall spaced from the pipe such that the flow of water creates a cyclonic path in the container. The pipe 22 will extend generally vertically adjacent to the wall 14 of the container. A connector 20 is fluidically connected to the pipe adjacent an upper end of the pipe. The connector 20 will extend outwardly of the upper edge 18 of the container 12. A hose 23 is affixed to the connector 20 so as to deliver water to the connector 20 and into and through the pipe 22.

Figure 2:
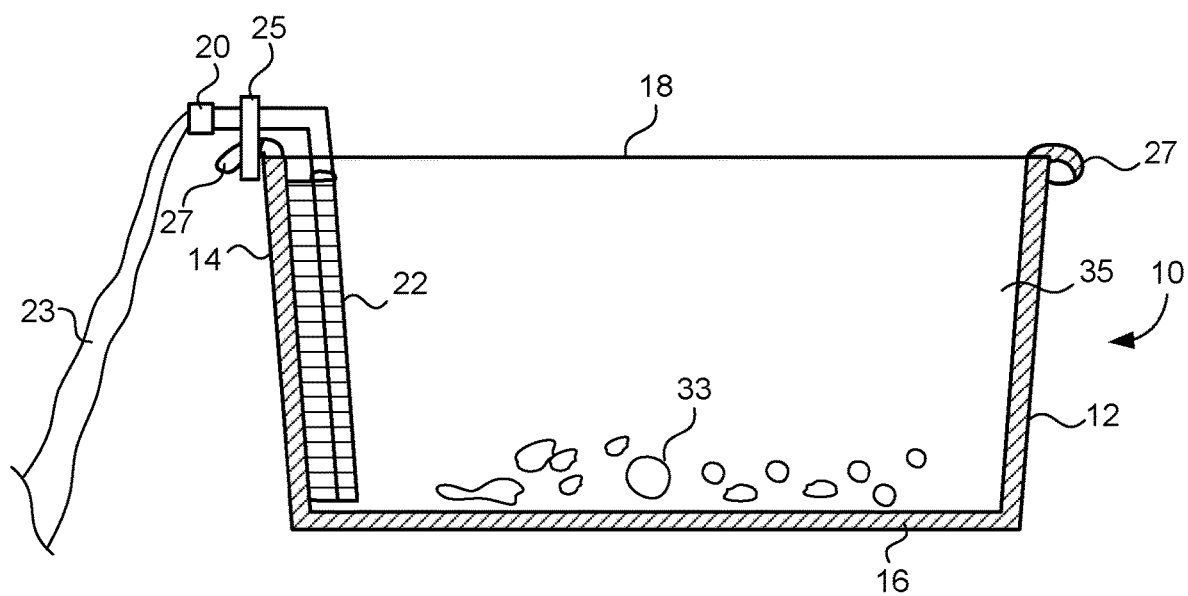
FIG. 2 is a cross-sectional view showing the washing apparatus of the present invention.

In FIG. 1, it can be seen that the pipe 22 is draped over the upper edge 18 of the container 12. In another embodiment (such as shown in FIG. 2), the pipe 22 are the connector 20 can be fastened to the upper edge 18 of the container 12. In any event, the pipe 22 can be removably affixed to the container 12. As such, when it is desired to clean food articles, the pipe 22 can be draped over the upper edge 18 of the container 12 so as to create the cyclonic flow path of water within the interior of the container 12. After the food has been cleaned, the pipe 22 can be lifted from the interior of the container over the upper edge 18 and then stored for later use.

FIG. 2 is a cross-sectional view of the apparatus 10 of the present invention. In FIG. 2, it can be seen that the pipe 22 is positioned adjacent to the wall 14 of the container 12. The pipe 22 has a plurality of apertures adapted to direct the flow of water toward a portion of the wall spaced from the pipe 22 such that the flow of water creates a cyclonic path in the container 12. The pipe 22 extends generally vertically adjacent to the wall 14 of the container. The connector 20 is illustrated as extending over the outer lip 27 of the upper edge 18 of the container 12. The connector 20 is in fluid-tight relationship with the pipe 22. As such, when water is introduced through the connector 20 by the use of the water hose 23, water will flow downwardly through the pipe 22 and be emitted through the various apertures of the pipe 22. The pipe 22 is illustrated in greater detail in FIGS. 7-9 herein. The lower end of the pipe 22 will be generally adjacent to the bottom 16 of the container 12. FIG. 2 further shows that food items 33 (such as game, fruit, vegetables, fish or crustacea) are received within the interior volume 35 of the container 12.

In FIG. 2, it can be seen that there is a fastener 25 that is secured to the connector 20. Fastener 25 can also be secured to the pipe 22 or separately secured to the pipe 22. In particular, the fastener 25 is a clamp that can engage the lip 27 at the upper edge 18 of the container 12 or engage another surface of the container 12. As such, the fastener 25 will removably position the pipe 22 in its generally vertical orientation within the container 12. This will secure the delivery of water by the water hose 23 into and through the pipe 22. After use, the clamp of the fastener 25 can be loosened so that the pipe 22 can be removed from the container 12.

Figure 3:
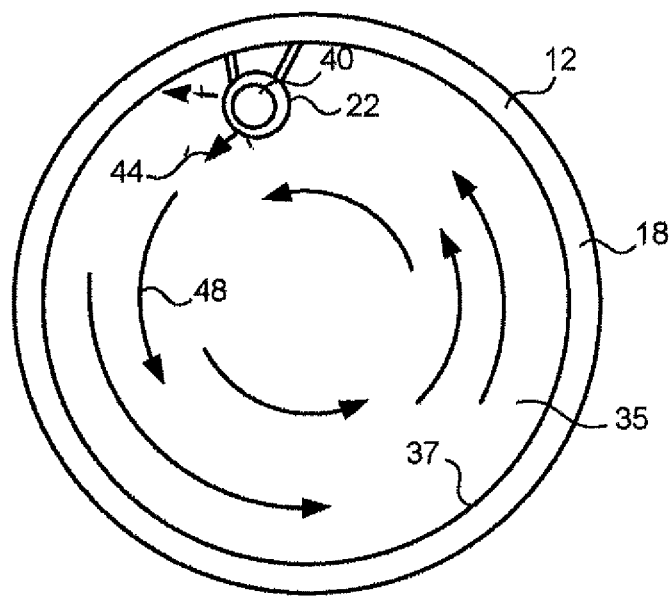
FIG. 3 is a plan view showing the cyclonic flow path of water in the container of the washing apparatus of the present invention.

FIG. 3 illustrates a plan view of the container 12 showing the upper edge 18 of the container 12. The container 12 has an inner wall 37 that defines the interior volume 35 the container 12. In FIG. 3, it can be seen that the pipe 22 is positioned adjacent to the inner wall 37 of the container 12.

In FIG. 3, water is directed from the interior 40 of the pipe 22 outwardly through the apertures. As such, the water will flow outwardly of the pipe 22 in a first direction 44 through a first set of apertures and will be directed in a second direction 46 through from a second set of apertures. The water flow 46 is directed toward a portion of the inner wall 37 of the container 12 in spaced relation to the pipe 22. The water flow 44 is directed from the second set of apertures outwardly of the pipe 22 also toward another portion of the inner wall 37 of the container. In particular, the water flow 46 is directed to the portion of the inner wall 37 of the container 12 generally adjacent to the pipe 22. The water flow 44 is directed toward a portion of the inner wall 37 at a location spaced further from the pipe 22 and spaced from the portion of the wall associated with the water flow 46. The direction 46 is generally a chord of a circumference of the container 12. By flowing the water in the first direction, a cyclonic path of water flow (illustrated by arrows 48) is created in the interior volume 35 of the container 12. The cyclonic path of water flow 48 serves to effectively separate the debris from the food articles. The first set of apertures of the pipe 22 will distribute the jets of water over a substantial portion of the height of the container 12. This has been found to enhance the strength of the cyclonic flow path and to create an improved washing effect. The water flow from the second set of apertures of the pipe 22 provides a broader flow which serves to agitate the water within the container 12 further and to pressure wash the food items within the container 12. As such, the combined water flows 44 and 46 serve to substantially increase the turbulence within the container for the purpose of separating debris from the food items. The water flow 46 creates the cyclonic flow path while the water flow 44 agitates the water flow and pressure washes the food items simultaneously. These water flows combine to enhance the ability of the present invention to effectively clean the food items and to remove the debris therefrom.

Figure 4:
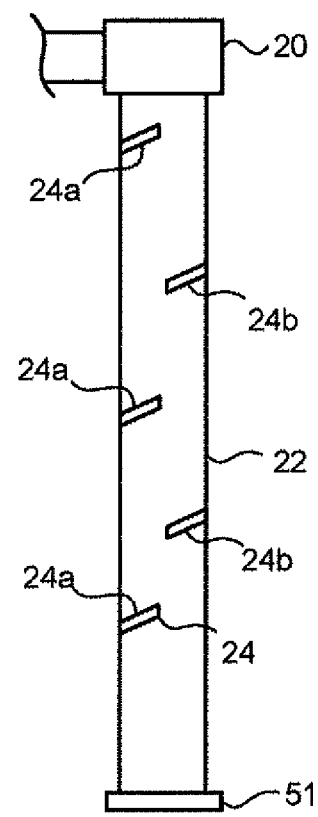
FIG. 4 is a diagrammatic illustration of the apertures that are formed on the pipe of the apparatus of the present invention.

FIG. 4 illustrates the configuration of the pipe 22. It can be seen that the apertures 24 are formed through the wall thickness of the pipe 22. A closure 51 is located at the bottom of the pipe 22 so as to effectively close the bottom of the pipe. The connector 20 is located at the top of the pipe 22 so as to allow the introduction of water into the interior 40 of the pipe 22. Within the concept of the present invention, the connector 20 can be at any location along the length of the pipe 22.

In FIG. 4, it can be seen that each of the apertures 24 includes a slot. The apertures 24 are positioned in generally spaced parallel relation to each other along the length of the pipe 22. A first set of apertures 24a will extend in one direction along a portion of the pipe 22 generally adjacent to the wall 16 of the container 12. A second set of apertures 24b are positioned on the pipe 22 away from the first set of apertures 24a. The second set of apertures 24b are directed further away from the wall of the container 12 than the apertures 24a. In the preferred embodiment of the present invention, there are a total of three apertures 24a and two apertures 24b. The apertures 24b are interposed longitudinally between the adjacent pairs of the apertures 24a. As such, this is configured to establish a broad fan-style spray of water flow from the pipe 22. It can be seen that each of the first set of apertures 24a and the second set of apertures 24b are canted at an approximately 30° angle to horizontal. Once again, this angled relationship of each of the apertures 24a and 24b is configured so as to create the optimal cyclonic water flow path and pressure washing. This slotted type of aperture 24, as opposed to holes or other type of openings, is intended to create a fan of water as it is ejected under pressure from each of the apertures 24. However, within the concept of the present invention, the apertures 24 can include holes, openings, and similar techniques for releasing the water under pressure from the pipe 22. Additionally, spray-type fittings could be placed within holes formed in the pipe 22. It is believed that the fan-shape flow of water greatly facilitates the pressure washing of the crustacea or game and enhances the creation of the cyclonic path of water flow. Additionally, such a fan-type spray further serves to distribute the pressurized water over a greater area than would be the release of water through the use of a simple circular hole pattern.

Figure 5:
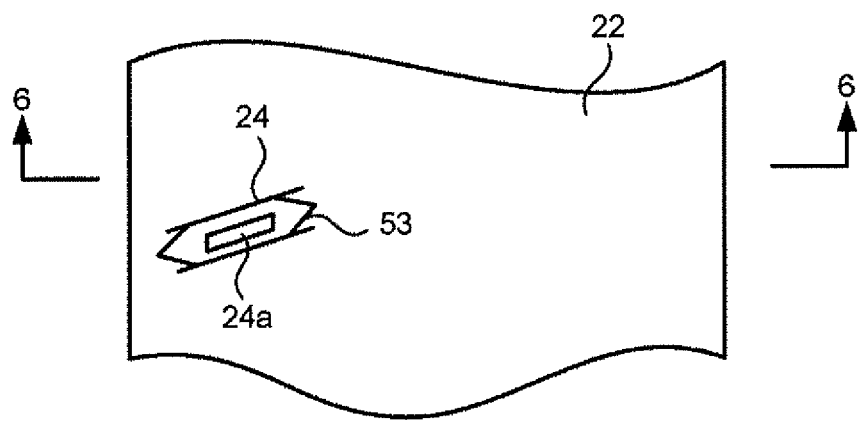
FIG. 5 is a detailed view showing the construction of the aperture on the pipe of the apparatus of the present invention.

FIG. 5 illustrates the construction of a single aperture 24. In particular, aperture 24a is shown as located within a slot 53. The slot 53 has a generally oval configuration with a widened central area and narrowing ends. In experiments with the present invention, it is found that the apertures 24 can be made in a rapid, efficient and effective manner by simply using a saw set to cut the pipe 22. The saw can be set so as to cut the slot 53 to a prescribed depth. Since the pipe 22 has a known wall thickness, the slot 53 is cut through the wall thickness so as to expose the aperture 24a. The aperture 24a is exposed so as to have a greater length than width. It can be seen that the aperture 24a is of an elongated nature. As such, this will cause a fan-type spray pattern. Additionally, the inner walls of the slot 53 will constrain the release of water into such a fan-type pattern and also, through the use of fluid dynamics, enhance the force of the water as it is emitted through the aperture 24a. It can further be seen that the slot 53 has a greater length and greater width than that of the aperture 24a.

FIG. 5 further shows that the slot 53 has been cut so as to be canted at an approximately 30° angle with respect to horizontal. Once again, this angling of the aperture 24a and its slot 53 further enhances the wide-area spray-type flow pattern. Apertures 24b will have a similar configuration to aperture 24a.

Figure 6:
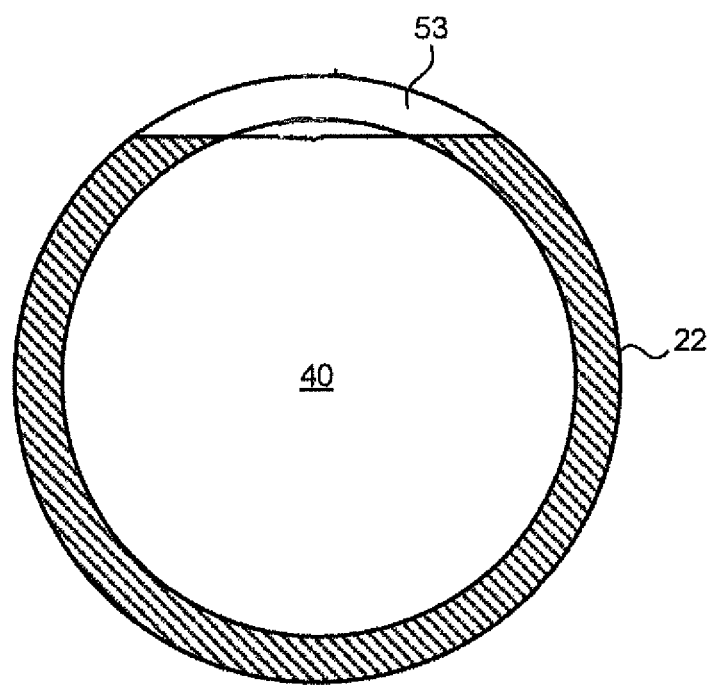
FIG. 6 is a cross-sectional view of the pipe as taken across lines 6-6 of FIG. 5.

FIG. 6 illustrates the construction of the slot 53 and the aperture 24a in a view taken across lines 6-6 of FIG. 5. As can be seen, the slot 53 is simply formed by cutting through the pipe 22 with a chop saw. As such, a relatively linear aperture 24 a is formed when the depth of the cut enters into the interior 40 of the pipe 22. As a result, water can be released through the aperture 24a and be restrained the directed by the wall created by the formation of the slot 53.

Figure 7:
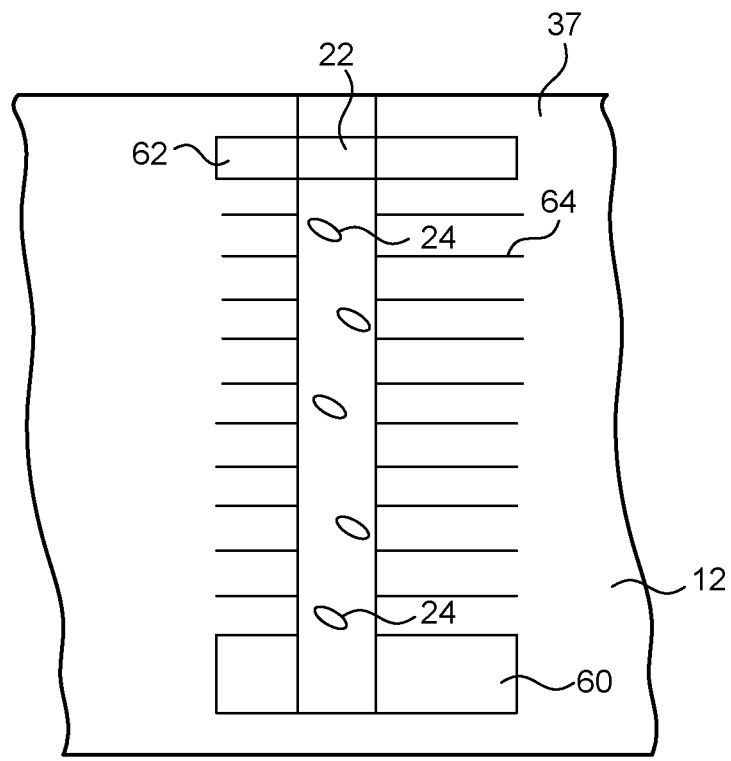
FIG. 7 is a frontal view of the pipe within the container of the apparatus of the present invention.

FIG. 7 particularly illustrates the configuration of the pipe 22 as positioned against the inner wall 37 of the container 12. It can be seen that the pipe 22 includes apertures 24 arranged in the manner described herein previously. There is a lower portion 60 that is positioned adjacent to the inner wall 37 and an upper portion 62 positioned against the inner wall 37. Portions 60 and 62 are at opposite ends of the pipe 22. A plurality of spacers 64 extend outwardly of the pipe 22 and, as will be described hereinafter, serve to bear against the inner wall 37 of the container 12. Importantly, in view of the flow of water emitted from the apertures 24, a cyclonic path of water flow will occur within the container 12. As such, under certain circumstances, it would be possible for the food items to become wedged between the surfaces of the pipe 22 and the inner wall 37 of the container 12. The spacers 64, which are in the nature of fins, serve to convey the food items or debris in a direction over and away from the pipe 22. As such, this avoids any possible lodging of the food items or debris between the inner wall 37 and the pipe 22 which could serve to impede the water flow from the apertures 24. These spacers or fins also serve to create a desirable laminar flow patterns of the cyclonic flow of water within the container.

Figure 8:
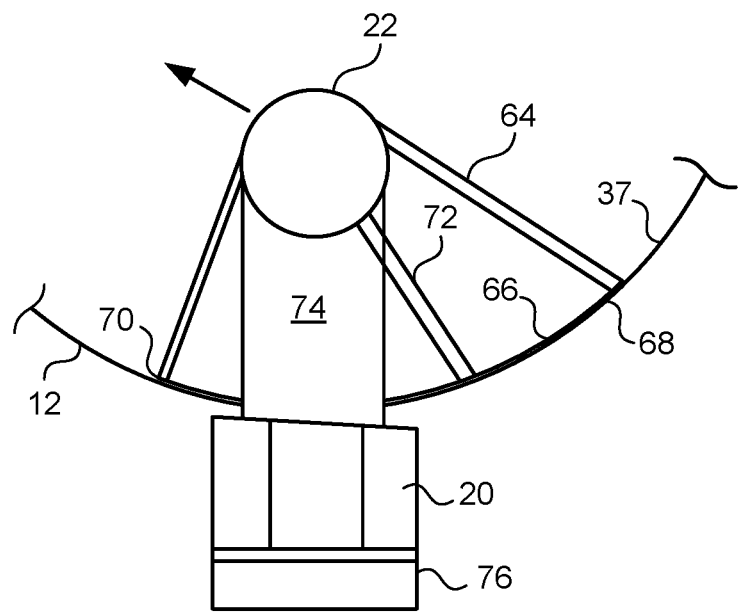
FIG. 8 is a bottom view of the pipe as positioned against the wall of the container of the apparatus of the present invention.

FIG. 8 illustrates the end view of the pipe 22 as positioned against the inner wall 37 of the container 12. It can be seen that the spacers 64 has a fan-shape configuration so as to extend to an outer edge 66. One end 68 of the outer edge 66 is spaced further from the pipe 22 than the opposite end 70 of the spacers 64. A rib 72 extends across the spacers 64 so as to enhance the structural stability of the spacer. A conduit 74 extends from the pipe 22. Conduit 74 communicates with the interior of the pipe 22. The connector 20 is affixed to the conduit 74 so as to extend outwardly of the container 12. The connector 20 has a fitting 76 thereon which can reserve to receive a water hose. As such, this allows water to be introduced into the interior of the pipe 22.

Figure 9:
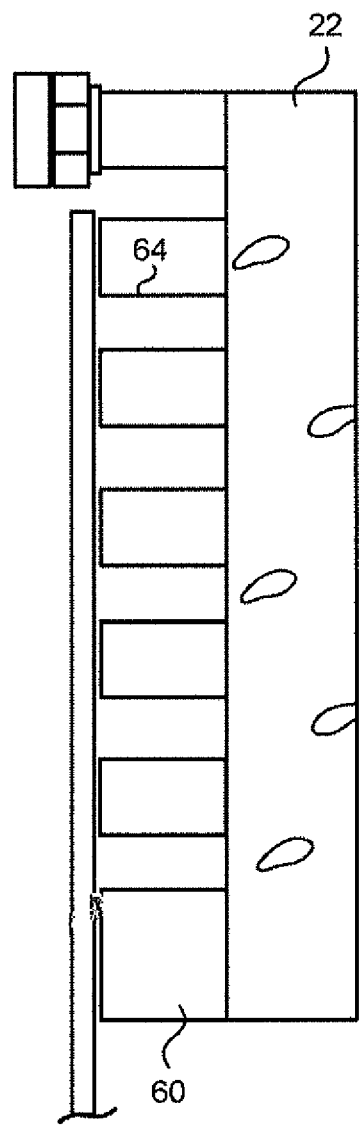
FIG. 9 is a side elevational view showing the placement of the pipe of the present invention against the wall of the container of the apparatus of the present invention.

FIG. 9 further illustrates how the pipe 22 is supported against the inner wall 37 of the container 12 through the use of the spacers 64. The upper portion of the pipe 22 has a spacer 64 that abuts the inner wall 37 of the container 12. The lower portion 60 will abut a lower portion of the inner wall 37. Spacer 64 extends in parallel relationship between the upper portion 62 and the lower portion 60.

Figure 10:
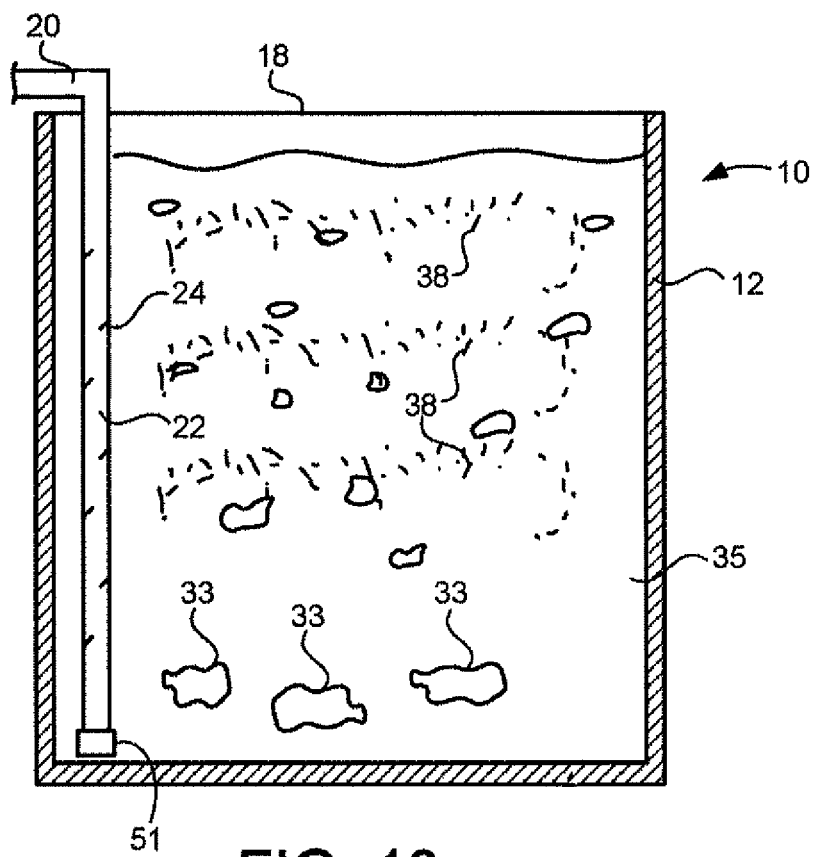
FIG. 10 is an illustration of the method of the present invention is used for the cleaning or washing of food articles.

FIG. 10 shows a step in the cleaning of food items in accordance with the present invention. In FIG. 10, the apparatus 10 includes the container 12 and the pipe 22 in the manner described herein previously. A garden hose can be connected to the connector 20. As such, the water hose can deliver water under pressure through the connector 20 and into the interior of the pipe 22. In FIG. 10, it can be seen that the pipe 22 includes the closure 51 at a lower end thereof. The upper end of the pipe 22 should be disposed above the upper edge 18 of the container 12.

In FIG. 10, water has been introduced through the apertures 24 of the pipe 22 and into the interior 35 of the container 12. The introduction of the water in the cyclonic flow path illustrated in FIG. 3 causes the food items 33 to generally tumble in the area adjacent to the bottom 16 of the container 12. The fan-type flow of water from the pipe 22 will serve to pressure-wash the tumbling food items 33. Additionally, the debris 38, in the nature of dirt, mud, feathers, blood, or the like, will tend to move upwardly toward the upper edge 18 of the container 12. This is because the debris 38 is generally less dense than water and less dense than the food items 33. The cyclonic flow of water within the container 12 also serves to urge the debris 38 upwardly. The continual flow of water into the interior 35 of the container 12 will continually dilute the debris within the container. As such, the debris will mix with the water and be discharged in the manner shown in FIG. 11.

Figure 11:
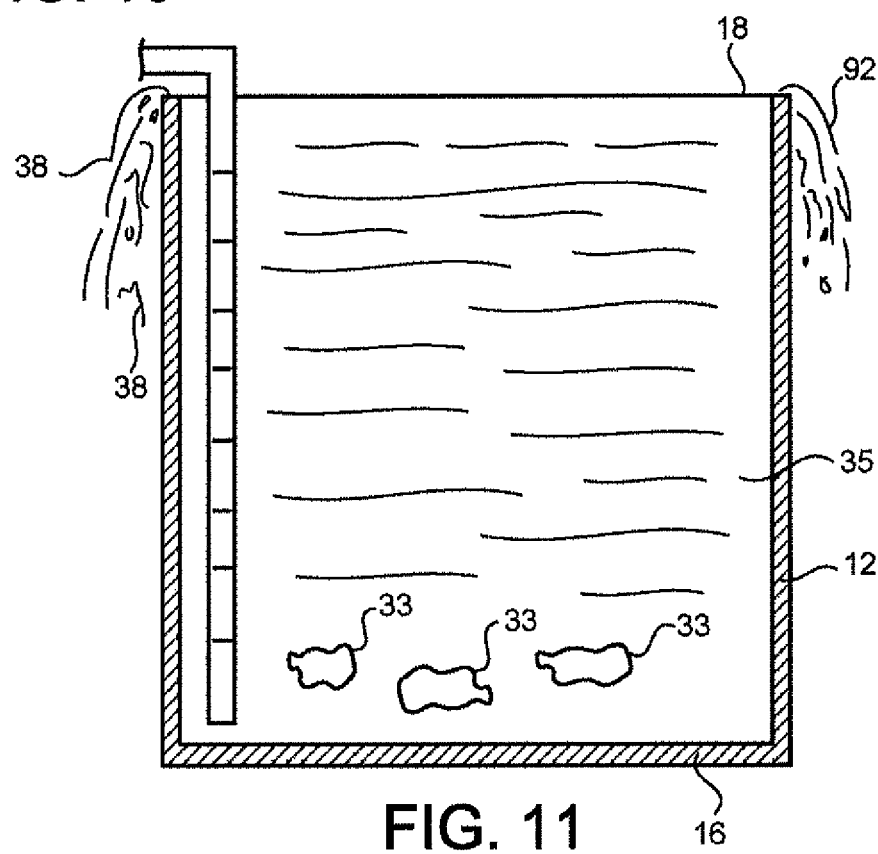
FIG. 11 is a illustration of a further step of the present invention as used in the cleaning of food articles.

In FIG. 11, after a certain amount of time, the food items 33 will reside adjacent to the bottom 16 of the container 12. The water 92 from the interior 35 of the container 12 overflows the upper edge 18 of the container 12. This overflow will serve to discharge the debris 38 outwardly of the container 12. Ultimately, after period of time, the debris from the food articles will continue to dilute until only clear water resides within the interior 35 of the container 12. After the debris 38 has been discharged over the upper edge 18 of the container 12, and after the water has become sufficiently clear, the water flow can be turned off and the food items 33 removed from the interior 35 of the container 12. The food items will be very clean and suitable for use without further treatment. For example, when crawfish is the crustacea used in the system of the present invention, the crawfish will be almost polished completely clean. As such, they can be passed for boiling during the crawfish boil. As such, the system of the present invention avoids the requirement for meticulously manually washing the food items. There is no need to fill buckets with food items and then use a water hose with the bucket in order to spray the food items and further dump the bucket after several sprayings. The present invention allows the food items to be cleaned in a relatively short period of time.

In the present invention, the container can be in the form of any container suitable for washing the food items. This can include buckets, tubs, pots or other containers. The containers can be constructed of plastic, stainless steel or other materials. In certain embodiments, the container can additionally be suitable for preparing the food items (such as boiling crawfish or other seafood) and other components of the present invention can be made of materials suitable for withstanding the associated higher temperatures.

The present invention provides great portability to the apparatus of the present invention. In the present invention, the pipe and the connector are not rigidly affixed to the container. As such, complex assembly procedures are not required. In the simplest embodiment, is only necessary to drape the pipe over the upper edge of the container and then turn on the water so that the pipe will spray the water into the container. In other circumstances, it may be necessary to maintain the fixed vertical orientation of the pipe within the container. As such, either the pipe or the connector can be clamped to the container. After use, the pipe is simply removed and stored for later use. The apparatus the present invention offers a very small footprint for merchandising and display in stores. The only assembly that is required is to connect a water hose to the connector and, possibly, affixing the connector to the container by the use of the clamp. The apparatus the present invention can be utilized in association with a wide variety of shapes and sizes of containers. Additionally, the pipe and the connector can be easily removed for the purpose of cleaning, sanitizing, and repair.

The foregoing disclosure and description of the invention is illustrative and explanatory thereof. Various changes in the details of the illustrated construction can be made is the scope of the present invention without departing from the true spirit of the invention. The present invention should only be limited by the following claims and their legal equivalents.

I claim:

1. An apparatus for cleaning game, vegetables, fish or crustacea in a container, the apparatus comprising:
    a pipe having a plurality of apertures formed in spaced relation to each other along a length of said pipe, said pipe adapted to extend generally vertically within the container, said plurality of apertures adapted to direct a flow of water in a cyclonic path in the container, said pipe having at least one spacer formed thereon or affixed thereto, the spacer positioned below an upper end of said pipe, the at least one spacer adapted to generally abut an inner surface of the container such that said pipe is spaced away from an inner wall of the container, the at least one spacer comprising a plurality of spacers extending transversely to a longitudinal axis of said pipe, each of said plurality of spacers comprising a fin having an outer edge, one end of said outer edge being radially closer to said pipe than an opposite end of said fin; and
    a connector connected to said pipe adjacent one end of said pipe, said connector adapted to connect to a water conduit so as to introduce water into and through said pipe.

2. The apparatus of claim 1, further comprising:
    a fastener affixed to said pipe or to said connector, said fastener adapted to affix said pipe to the container.

3. The apparatus of claim 2, said fastener adapted to removably affix said pipe to the container.

4. The apparatus of claim 2, said fastener being a clamp.

5. An apparatus for cleaning game, fruit, vegetables, fish, or crustacea, the apparatus comprising:
    a container having an interior volume defined by a wall, said container having a bottom and an upper edge;
    a pipe having a plurality of apertures formed in spaced relation to each other along a length of said pipe, said pipe extending entirely vertically within said container, said plurality of apertures adapted to direct a flow of water in a cyclonic path in said container; and
    a connector connected to said pipe adjacent one end of said pipe, said connector adapted to introduce water into and through said pipe from a water hose, said pipe having a plurality of spacers extending transversely to a longitudinal axis of said pipe, said plurality of spacers abutting said wall of said container, each of said plurality of spacers comprising a fin having an outer edge, one end of said outer edge being radially closer to said pipe than an opposite end of said fin.

6. The apparatus of claim 5, said pipe being clamped to said container at or adjacent to said upper edge.

7. The apparatus of claim 5, further comprising:
a fastener affixed to said pipe or said connector, said fastener affixing said pipe to said container.

8. The apparatus of claim 5, said connector positioned over said upper edge of said container.

9. The apparatus of claim 5, further comprising:
a water hose affixed to said connector, said water hose extending outwardly exterior of said container.

10. A spraying article for cleaning game, fruit, vegetable, fish, or crustacea in a container, the spraying article comprising:
a pipe having a plurality of apertures formed in spaced relation to each other along a length of said pipe, said plurality of apertures adapted to direct a flow of water in a cyclonic path in the container, said pipe having a plurality of spacers arranged in spaced relationship to each other and extending transversely to the longitudinal axis of said pipe, said plurality of spacers adapted to generally abut an inner wall of the container; and
a connector connected to said pipe adjacent one end of said pipe, said connector adapted to introduce water into and through said pipe from a water hose, each of said plurality of spacers comprising a fin having an outer edge, one end of said outer edge being radially closer to said pipe than an opposite end of said fin.

* * * * *